(12) United States Patent
Zohar et al.

(10) Patent No.: US 8,010,753 B2
(45) Date of Patent: Aug. 30, 2011

(54) SYSTEMS AND METHODS FOR TEMPORARILY TRANSFERRING USE OF PORTIONS OF PARTITIONED MEMORY BETWEEN HOST COMPUTERS

(75) Inventors: Ofir Zohar, Alfe-Menashe (IL); Haim Helman, Herzelya (IL); Dror Cohen, Tel Aviv (IL); Shemer Schwartz, Tel Aviv (IL); Kariel Sendler, Bat-Hefer (IL); Efri Zeidner, Mozkin (IL)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/527,034

(22) Filed: Sep. 26, 2006

(65) Prior Publication Data

US 2007/0073994 A1  Mar. 29, 2007

Related U.S. Application Data

(60) Provisional application No. 60/721,061, filed on Sep. 28, 2005.

(51) Int. Cl.
*G06F 12/02* (2006.01)
(52) U.S. Cl. .................................. 711/153; 711/E12.016
(58) Field of Classification Search ................... 711/173, 711/168, 114, 153, E12.016
See application file for complete search history.

(56) References Cited

U.S. PATENT DOCUMENTS

| | | | |
|---|---|---|---|
| 5,615,352 A | 3/1997 | Jacobson et al. | |
| 5,960,169 A * | 9/1999 | Styczinski | 714/6 |
| 6,209,059 B1 * | 3/2001 | Ofer et al. | 711/114 |
| 6,453,383 B1 * | 9/2002 | Stoddard et al. | 711/112 |
| 2002/0049825 A1 * | 4/2002 | Jewett et al. | 709/215 |
| 2002/0169877 A1 * | 11/2002 | Bantz et al. | 709/226 |
| 2003/0158884 A1 * | 8/2003 | Alford, Jr. | 709/104 |
| 2004/0057200 A1 * | 3/2004 | Blin et al. | 361/683 |
| 2004/0088514 A1 * | 5/2004 | Bullen et al. | 711/202 |
| 2004/0210648 A1 * | 10/2004 | Woodruff | 709/221 |
| 2004/0215831 A1 * | 10/2004 | Shoji et al. | 709/249 |
| 2004/0215883 A1 * | 10/2004 | Bamford et al. | 711/129 |
| 2005/0010722 A1 * | 1/2005 | Chen | 711/114 |
| 2005/0015655 A1 * | 1/2005 | Clayton et al. | 714/6 |
| 2005/0091454 A1 * | 4/2005 | Shimada et al. | 711/114 |
| 2005/0138286 A1 * | 6/2005 | Franklin et al. | 711/114 |
| 2005/0193167 A1 * | 9/2005 | Eguchi et al. | 711/114 |
| 2005/0229033 A1 * | 10/2005 | Tanaka et al. | 714/6 |
| 2006/0020752 A1 * | 1/2006 | Schnapp et al. | 711/113 |
| 2006/0053263 A1 * | 3/2006 | Prahlad et al. | 711/162 |
| 2007/0002612 A1 * | 1/2007 | Chang et al. | 365/185.01 |
| 2007/0033341 A1 * | 2/2007 | Hashimoto et al. | 711/113 |

* cited by examiner

*Primary Examiner* — Shane M Thomas
*Assistant Examiner* — Hal Schnee
(74) *Attorney, Agent, or Firm* — Griffiths & Seaton PLLC

(57) ABSTRACT

A method for operating a storage system, consisting of performing an allocation of respective partitions of a physical storage resource of the storage system to respective hosts of the storage system. The method also includes changing the allocation while permitting the respective hosts of the storage system to access the physical storage resource.

18 Claims, 8 Drawing Sheets

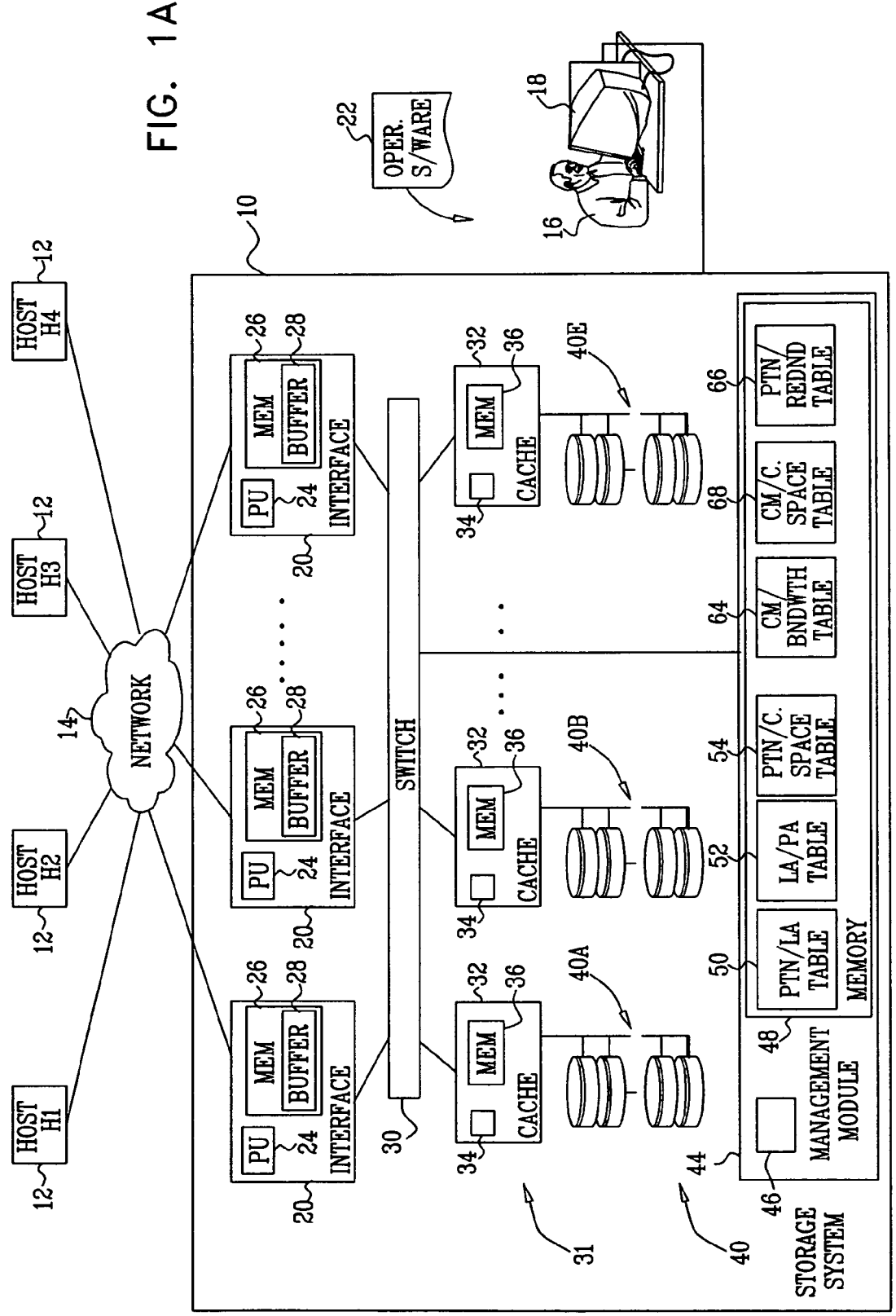

FIG. 1B

| PTN | LA RANGE | I/O |
|---|---|---|
| P1 | H0000-H0FFF | |
| P2 | H1000-H1FFF | |
| P3 | H2000-H2FFF | |
| U/A | H3000-H3FFF | |

50

| PTN | LA RANGE | I/O |
|---|---|---|
| P1 | H0000-H0FFF H3000-H39FF | |
| P2 | H1000-H1FFF | |
| P3 | H2000-H2FFF | |
| U/A | H3A00-H3FFF | |

50'

| PTN | LA RANGE | I/O |
|---|---|---|
| P1 | H0000-H19FF | |
| P2 | H1A00-H1FFF | |
| P3 | H2000-H2FFF | |
| U/A | H3000-H3FFF | |

50''

| PTN | COND. SPACE |
|---|---|
| P1 | 0% |
| P2 | 70% |
| P3 | 0% |

54

|  | LA SUBRANGES | PA SUBRANGES | USE |
|---|---|---|---|
| P1 | H0000-H00FF | 40A1 000-0FF | 1 |
| | H0100-H01FF | 40B1 000-0FF | 0 |
| | H0200-H02FF | 40C1 000-0FF | 1 |
| | H0300-H03FF | 40D1 000-0FF | 1 |
| | H0400-H04FF | 40E1 000-0FF | 1 |
| | H0500-H05FF | 40A2 000-0FF | 1 |
| | ⋮ | ⋮ | ⋮ |
| | H0F00-H0FFF | 40A4 000-0FF | 1 |
| P2 | H1000-H10FF | 40A1 100-1FF | 0 |
| | H1100-H11FF | 40B1 100-1FF | 0 |
| | ⋮ | ⋮ | ⋮ |
| | H1900-H19FF | 40E2 100-1FF | 0 |
| | H1A00-H1AFF | 40A3 100-1FF | 1 |
| | ⋮ | ⋮ | ⋮ |
| | H1F00-H1FFF | 40A2 100-1FF | 0 |
| P3 | H2000-H20FF | 40A1 200-2FF | 1 |
| | ⋮ | ⋮ | ⋮ |
| | H2F00-H2FFF | 40A4 200-2FF | 1 |
| U/A | H3000-H30FF | 40A1 300-3FF | 0 |
| | ⋮ | ⋮ | ⋮ |
| | H3F00-H3FFF | 40A4 300-3FF | 0 |

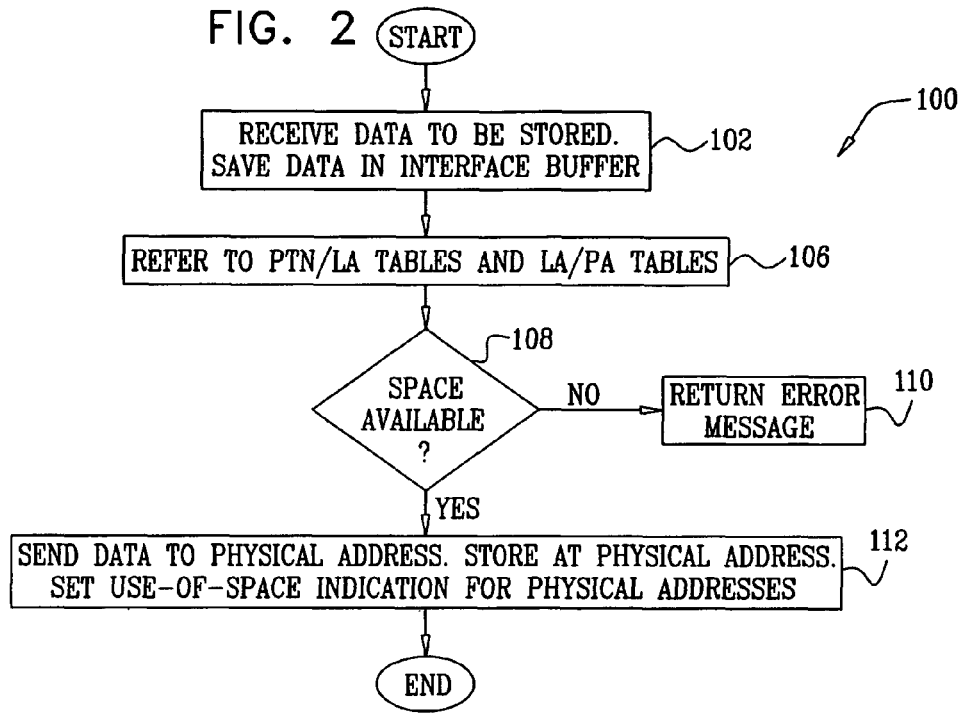
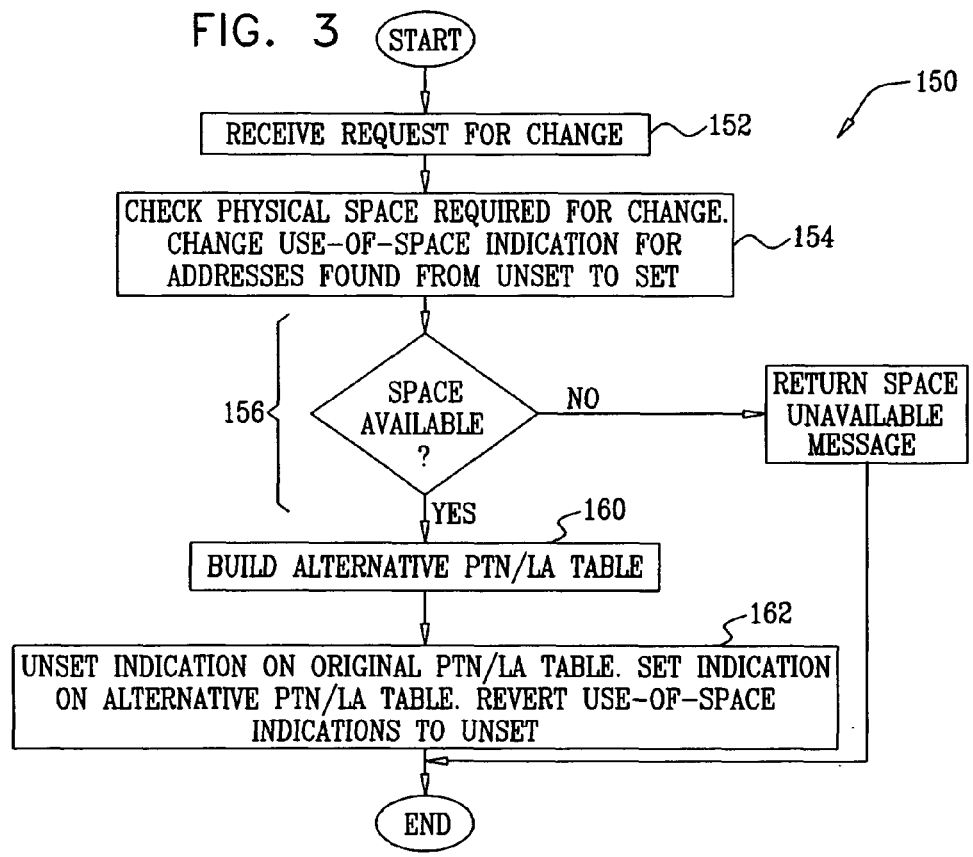

FIG. 4

48 — MEMORY

64

| HOST/CACHE MEMORY PARTITION | QUEUE PERCENTAGE |
|---|---|
| H1/CM1 | 40% |
| H2/CM2 | 30% |
| H3/CM3 | 30% |

64'

| HOST/CACHE MEMORY PARTITION | QUEUE PERCENTAGE |
|---|---|
| H1/CM1 | 50% |
| H2/CM2 | 20% |
| H3/CM3 | 30% |

68

| CACHE MEMORY PARTITION | COND. TRANSFERABLE CACHE MEMORY |
|---|---|
| CM1 | 10% |
| CM2 | 10% |
| CM3 | 10% |

FIG. 6

| PARTITION | REDUNDANCY SCHEME | SET/UNSET ~67 |
|---|---|---|
| P1 | RAID 5 | |
| P2 | RAID 6 | ~66 |
| P3 | RAID 5 | |

FIG. 7

|   | LA SUBRANGES | PA SUBRANGES | DATA/PARITY BLOCKS SET/UNSET ~251 / ~250 |
|---|---|---|---|
| P1 | H0000-H00FF | 40A1 000-0FF | D1 |
|    | H0100-H01FF | 40B1 000-0FF | D2 |
|    | H0200-H02FF | 40C1 000-0FF | D3 |
|    | H0300-H03FF | 40D1 000-0FF | Y13 |
|    | H0400-H04FF | 40E1 000-0FF | D4 |
|    | H0500-H05FF | 40A2 000-0FF | D5 |
|    | H0600-H06FF | 40B2 000-0FF | D6 |
|    | H0700-H07FF | 40C2 000-0FF | Y46 |
|    | H0800-H08FF | 40D2 000-0FF | D7 |
|    | H0900-H09FF | 40E2 000-0FF | D8 |
|    | H0A00-H0AFF | 40A3 000-0FF | D9 |
|    | H0B00-H0BFF | 40B3 000-0FF | Y79 |
|    | H0C00-H0CFF | 40C3 000-0FF | DA |
|    | H0D00-H0DFF | 40D3 000-0FF | DB |
|    | H0E00-H0EFF | 40E3 000-0FF | DC |
|    | H0F00-H0FFF | 40A4 000-0FF | YAC |
| P2 | H1000-H10FF | 40A1 100-1FF | D1 |
|    | H1100-H11FF | 40B1 100-1FF | D2 |
|    | H1200-H12FF | 40C1 100-1FF | D3 |
|    | H1300-H13FF | 40D1 100-1FF | Y(1)13 |
|    | H1400-H14FF | 40E1 100-1FF | Y(2)13 |
|    | H1500-H15FF | 40A2 100-1FF | D4 |
|    | H1600-H16FF | 40B2 100-1FF | D5 |
|    | H1700-H17FF | 40C2 100-1FF | D6 |
|    | H1800-H18FF | 40D2 100-1FF | Y(1)46 |
|    | H1900-H19FF | 40E2 100-1FF | Y(2)46 |
|    | H1A00-H1AFF | 40A3 100-1FF | D7 |
|    | H1B00-H1BFF | 40B3 100-1FF | D8 |
|    | H1C00-H1CFF | 40C3 100-1FF | D9 |
|    | H1D00-H1DFF | 40D3 100-1FF | Y(1)79 |
|    | H1E00-H1EFF | 40E3 100-1FF | Y(2)79 |
|    | H1F00-H1FFF | 40A4 100-1FF | |
| P3 | H2000-H20FF | 40A1 200-2FF | D1 |
|    | ⋮ | ⋮ | ⋮ |
|    | H2F00-H2FFF | 40A4 200-2FF | YAC |
| U/A | H3000-H30FF | 40A1 300-3FF | |
|    | ⋮ | ⋮ | |
|    | H3F00-H3FFF | 40A4 300-3FF | |

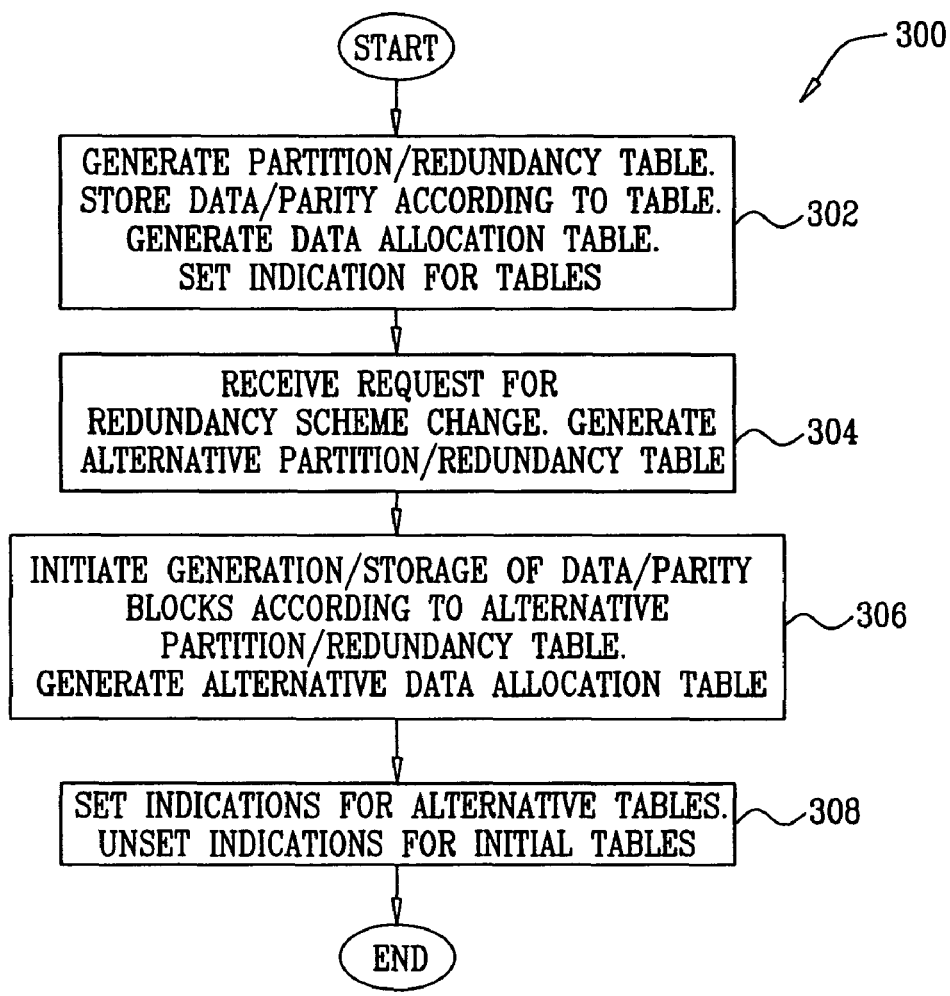

FIG. 9A

| PARTITION | REDUNDANCY SCHEME |
|---|---|
| P1 | RAID 6 |
| P2 | RAID 6 |
| P3 | RAID 5 |

SET/UNSET ~67
~66'

FIG. 9B

SET/UNSET ~251
~250'

| LA SUBRANGES | PA SUBRANGES | DATA/PARITY BLOCKS |
|---|---|---|
| H0000-H00FF | 40A1 000-0FF | D1 |
| H0100-H01FF | 40B1 000-0FF | D2 |
| H0200-H02FF | 40C1 000-0FF | D3 |
| H3300-H33FF | 40D1 300-3FF | Y(1)13 |
| H3400-H34FF | 40E1 300-3FF | Y(2)13 |
| H0400-H04FF | 40E1 000-0FF | D4 |
| H0500-H05FF | 40A2 000-0FF | D5 |
| H0600-H06FF | 40B2 000-0FF | D6 |
| H3700-H37FF | 40C2 300-3FF | Y(1)46 |
| H3800-H38FF | 40D2 300-3FF | Y(2)46 |
| H0800-H08FF | 40D2 000-0FF | D7 |
| H0900-H09FF | 40E2 000-0FF | D8 |
| H0A00-H0AFF | 40A3 000-0FF | D9 |
| H3B00-H3BFF | 40B3 300-3FF | Y(1)79 |
| H3C00-H3CFF | 40C3 300-3FF | Y(2)79 |
| H0C00-H0CFF | 40C3 000-0FF | DA |
| H0D00-H0DFF | 40D3 000-0FF | DB |
| H0E00-H0EFF | 40E3 000-0FF | DC |
| H3F00-H3FFF | 40A4 300-3FF | Y(1)AC |
| H3000-H30FF | 40A1 300-3FF | Y(2)AC |

P1

SYSTEMS AND METHODS FOR TEMPORARILY TRANSFERRING USE OF PORTIONS OF PARTITIONED MEMORY BETWEEN HOST COMPUTERS

CROSS-REFERENCE TO RELATED APPLICATIONS

This application claims the benefit of U.S. Provisional Patent Application 60/721,061, filed Sep. 28, 2005, which is incorporated herein by reference.

FIELD OF THE INVENTION

The present invention relates generally to data storage, and specifically to a system for varying the conditions for storage of data in a data storage system.

BACKGROUND OF THE INVENTION

At startup, data storage systems are configured by a system installation engineer according to requirements of the system, as well as according to requirements of hosts using the system. Typically, the process of configuration is relatively time-consuming, and depending on the system's size and complexity, may take hours or even days before the system is operating smoothly.

Changes to the configuration of an operating data storage system, while not necessarily taking such lengths of times as those needed at startup, may still require considerable time, depending on the type of configuration change. Furthermore, while the change is being implemented, the storage system is not available to the hosts. The time requirement and the unavailability both cause problems for operation of the storage system.

SUMMARY OF THE INVENTION

In embodiments of the present invention, one or more partitions of a physical resource of a data storage system are allocated dynamically. As the dynamic allocation of the partitions is performed and/or altered, the data storage system continues to function with no appreciable change in other operating parameters of the system. Examples of resources that may have partitions altered comprise, but are not limited to, size/type of non-volatile storage system space, size/type of volatile storage system space, rates/types of operations between hosts and the storage system, and type of data protection. The allocation for partitions of a specific resource is typically contained within a respective look-up table in the storage system. A controller of the system refers to the table as data is read from and/or written to the system. Any change in a partition of the resource is performed by changing the resource's look-up table.

Any changes in the storage system due to changing the look-up table may be performed as background operations. For example, the size of a specific allocation of logical addresses may be increased/decreased by changing a look-up table of sizes, and the size changes may be implemented without affecting other operations of the storage system. A change of a type of data protection, such as a change from a redundancy of one storage device to two storage devices or vice versa, may require generation of extra parity information, or deletion of surplus parity information. The generation/deletion may be completed in background, without affecting the operation of the storage system until such completion. The dynamic allocation of partitions of resources provided by embodiments of the present invention increases the flexibility and efficiency of functioning of the storage system, without affecting its on-going operation.

The changes in allocation of partitions of physical resources are substantially independent of each other. For example, a change in maximum allocated bandwidth to a specific host, implemented by changing an allocation of cache memory to the host, may be accomplished with no change in the size of storage space allocated to the host. Similarly, a change in level of redundancy protection for data stored at a logical unit may be accomplished with no change in bandwidth for accessing the logical unit.

In some embodiments of the present invention, at least a portion of one or more of the partitions of a physical resource is conditionally transferable. A portion of a resource is conditionally transferable if a contract that a host has with the storage system operator allows the operator to temporarily transfer use of the portion, under specific conditions, to another user of the storage system. Such conditional transferability, combined with the dynamic allocation of partitions described herein, allows the operator of the storage system to maximize use of the resources of the system, and to change the use efficiently according to need.

There is therefore provided, according to an embodiment of the present invention, a method for operating a storage system, including:

performing an allocation of respective partitions of a physical storage resource of the storage system to respective hosts of the storage system; and changing the allocation while permitting the respective hosts of the storage system to access the physical storage resource.

Typically, the physical storage resource includes a slow-access physical storage medium, and the allocation of the respective partitions includes respective numbers of physical addresses of the slow-access physical storage medium allocated to the respective hosts for storage of data.

Alternatively or additionally, the physical storage resource includes a fast-access physical storage medium, and the allocation of the respective partitions includes respective numbers of physical addresses of the fast-access physical storage medium allocated to the respective hosts for transfer of data according to respective preset data transfer bandwidths.

In one embodiment the allocation of the respective partitions of the physical storage resource includes an allocation of two or more different redundancy schemes to the respective hosts. Typically, the physical storage resource includes a non-volatile physical storage medium, performing the allocation includes storing data at physical addresses of the medium according to the allocation, and wherein changing the allocation comprises storing further data at alternate physical addresses of the medium.

In a disclosed embodiment, performing the allocation includes allocating a given partition of the respective partitions to a given host of the respective hosts, and changing the allocation includes transferring a portion of the given partition for use by another host of the respective hosts. The given host may agree to a transfer of the portion prior to the transfer. The method may include verifying that the portion is not being used by the given host prior to a transfer of the portion.

In some embodiments, performing the allocation includes:

allocating a given partition of the respective partitions to a given host of the respective hosts; and monitoring use of the given partition according to directions of an operator of the storage system, and changing the allocation includes transferring, in response to the monitoring, a portion of the given partition for use by another host of the respective hosts.

There is further provided, according to an embodiment of the present invention, a method for operating a storage system, including:

connecting the storage system to a plurality of hosts;

configuring a physical storage resource of the storage system to operate at a maximum rate of access for the plurality of the hosts; and changing an allocation of respective partitions of the physical storage resource to respective hosts of the storage system while permitting the plurality of the hosts to access the physical storage resource at the maximum rate of access.

There is further provided, according to an embodiment of the present invention, a method for operating a storage system, including:

connecting the storage system to a plurality of hosts;

configuring a first physical storage resource of the storage system to operate at a maximum rate of access for the plurality of the hosts; and changing an allocation of respective partitions of a second physical storage resource of the storage system to respective hosts of the storage system while permitting the plurality of the hosts to access the first physical storage resource at the maximum rate of access.

Typically, the first physical storage resource includes a fast-access cache, and the second physical storage resource comprises a non-volatile storage medium coupled to the fast-access cache.

There is further provided, according to an embodiment of the present invention, a method for storing data in a system of storage devices, the method including:

protecting a first group of the data in accordance with a first redundancy scheme;

protecting a second group of the data in accordance with a second redundancy scheme, different from the first redundancy scheme;

storing the first group of the data on a first assemblage of the storage devices; and storing the second group of the data on a second assemblage of the storage devices, such that the first and the second assemblages include at least one storage device in common.

Typically, the first group of the data includes a first set of data blocks and one or more first parity blocks of the first set formed in accordance with the first redundancy scheme. The second group of the data may be a second set of data blocks and one or more second parity blocks of the second set formed in accordance with the second redundancy scheme.

In a disclosed embodiment the first redundancy scheme and the second redundancy scheme are chosen from one of the redundant array of independent disks (RAID) schemes RAID 1, RAID 2, RAID 3, RAID 4, RAID 5, and RAID 6.

There is further provided, according to an embodiment of the present invention, apparatus for operating a storage system, including:

a processing unit which is configured to perform an allocation of respective partitions of a physical storage resource of the storage system to respective hosts of the storage system, and to change the allocation while permitting the respective hosts of the storage system to access the physical storage resource.

Typically, the physical storage resource includes a slow-access physical storage medium, and the allocation of the respective partitions includes respective numbers of physical addresses of the slow-access physical storage medium allocated to the respective hosts for storage of data.

The physical storage resource may include a fast-access physical storage medium, and the allocation of the respective partitions may include respective numbers of physical addresses of the fast-access physical storage medium allocated to the respective hosts for transfer of data according to respective preset data transfer bandwidths.

The allocation of the respective partitions of the physical storage resource may include an allocation of two or more different redundancy schemes to the respective hosts. The physical storage resource may include a non-volatile physical storage medium, wherein performing the allocation includes storing data at physical addresses of the medium according to the allocation, and wherein changing the allocation includes storing further data at alternate physical addresses of the medium.

Performing the allocation may include allocating a given partition of the respective partitions to a given host of the respective hosts, and changing the allocation may include transferring a portion of the given partition for use by another host of the respective hosts. The processing unit may be configured to verify that the given host agrees to a transfer of the portion prior to the transfer. The processing unit may be configured to verify that the portion is not being used by the given host prior to a transfer of the portion.

Typically, performing the allocation includes:

allocating a given partition of the respective partitions to a given host of the respective hosts; and monitoring use of the given partition according to directions of an operator of the storage system, and wherein changing the allocation includes transferring, in response to the monitoring, a portion of the given partition for use by another host of the respective hosts.

There is further provided, according to an embodiment of the present invention, apparatus for operating a storage system, including:

a communication link which is configured to couple the storage system to a plurality of hosts; and a processing unit which is configured to operate a physical storage resource of the storage system at a maximum rate of access for the plurality of the hosts, and to change an allocation of respective partitions of the physical storage resource to respective hosts of the storage system while permitting the plurality of the hosts to access the physical storage resource at the maximum rate of access.

There is further provided, according to an embodiment of the present invention, apparatus for operating a storage system, including:

a communication link which is configured to couple the storage system to a plurality of hosts; and a processing unit which is configured to operate a first physical storage resource of the storage system at a maximum rate of access for the plurality of the hosts, and to change an allocation of respective partitions of a second physical storage resource of the storage system to respective hosts of the storage system while permitting the plurality of the hosts to access the first physical storage resource at the maximum rate of access.

Typically, the first physical storage resource includes a fast-access cache, and the second physical storage resource includes a non-volatile storage medium coupled to the fast-access cache.

There is further provided, according to an embodiment of the present invention, apparatus for storing data in a system of storage devices, including:

a processing unit which is configured to protect a first group of the data in accordance with a first redundancy scheme, and to protect a second group of the data in accordance with a second redundancy scheme, different from the first redundancy scheme;

a first assemblage of the storage devices wherein the first group of the data is stored; and a second assemblage of the storage devices wherein the second group of the data is stored, such that the first and the second assemblages comprise at least one storage device in common.

Typically, the first group of the data includes a first set of data blocks and one or more first parity blocks of the first set formed in accordance with the first redundancy scheme. The second group of the data may include a second set of data blocks and one or more second parity blocks of the second set formed in accordance with the second redundancy scheme.

Typically, the first redundancy scheme and the second redundancy scheme are chosen from one of the redundant array of independent disks (RAID) schemes RAID 1, RAID 2, RAID 3, RAID 4, RAID 5, and RAID 6.

The present invention will be more fully understood from the following detailed description of the embodiments thereof, taken together with the drawings in which:

BRIEF DESCRIPTION OF THE DRAWINGS

FIG. 1A is a schematic block diagram of a data storage system, and FIG. 1B shows detail of tables used in the system, according to an embodiment of the present invention;

FIG. 2 is a flowchart showing steps that a management module performs to store data in the system of FIGS. 1A and 1B, according to an embodiment of the present invention;

FIG. 3 shows a flowchart which comprises steps performed by the management module on receipt of a request to change the range of logical addresses assigned to a logical unit in the storage system of FIG. 1A, according to an embodiment of the present invention;

FIG. 4 is a schematic diagram of a bandwidth table and an alternative bandwidth table, according to an embodiment of the present invention;

FIG. 6 is a schematic diagram of a redundancy scheme table, according to an embodiment of the present invention;

FIG. 7 is a data allocation table showing how data is stored in compliance with the redundancy scheme table, according to an embodiment of the present invention;

FIG. 8 is a flowchart of steps taken by the management module to implement redundancy schemes and changes of redundancy schemes in the storage system, according to an embodiment of the present invention; and FIGS. 9A and 9B show an alternative data allocation table complying with an alternative redundancy scheme table, according to an embodiment of the present invention.

DETAILED DESCRIPTION OF EMBODIMENTS

Figure 5:
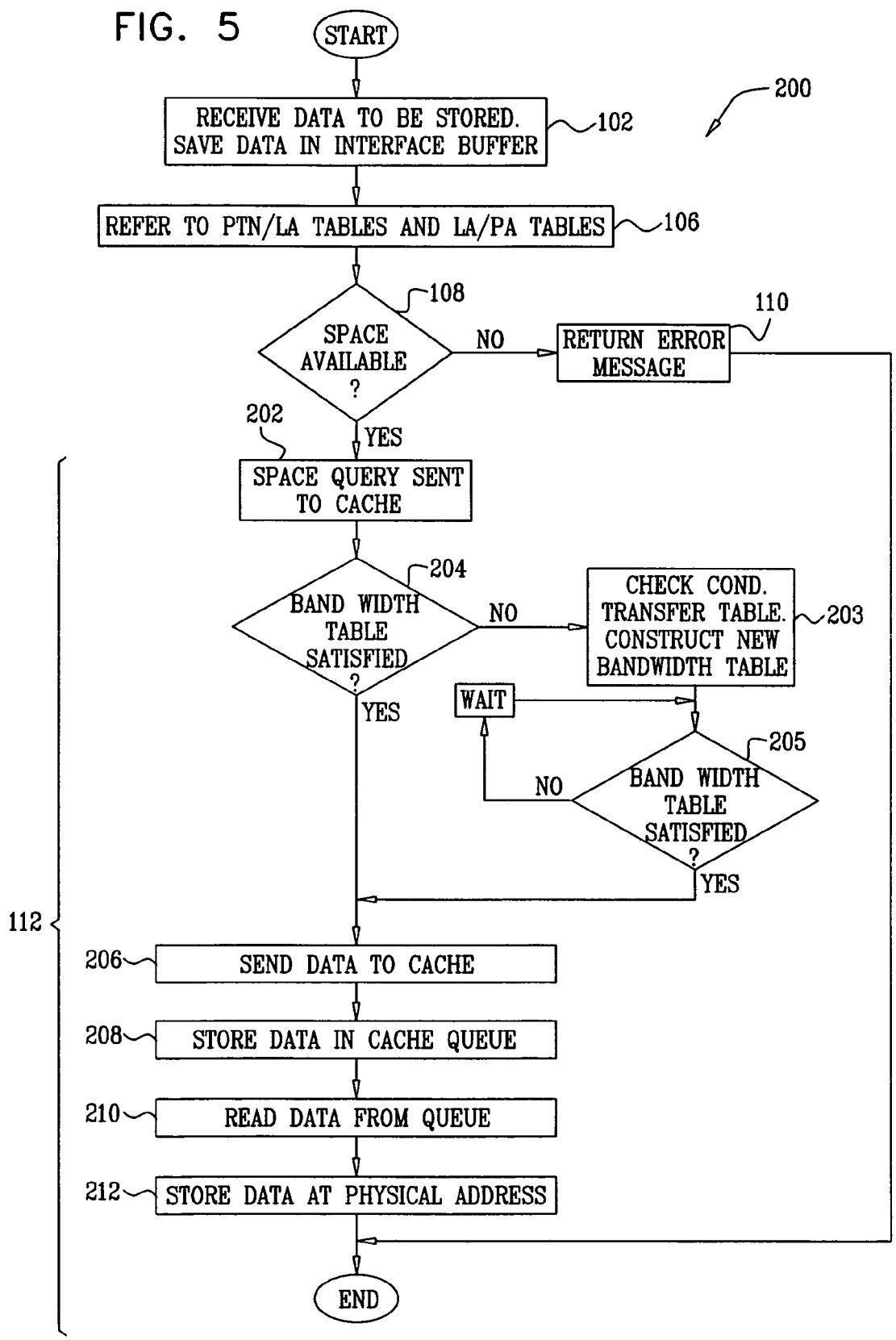
FIG. 5 is a flowchart showing utilization of the bandwidth table of FIG. 4 when data is stored in the storage system of FIG. 1A, according to an embodiment of the present invention.

Reference is now made to FIG. 1A, which is a schematic block diagram of a data storage system 10, and to FIG. 1B, which shows detail of tables used in system 10, according to an embodiment of the present invention. System 10 is coupled to one or more generally similar hosts 12, also referred to herein as hosts H1, H2, which store data on the system and read the stored data from the system. Hosts 12 are typically coupled to system 10 via a network 14, such as the Internet, although any other form of coupling, such as a direct coupling from one or more hosts to the system may be used. The form of coupling may be wired, fiber optic, and/or wireless coupling. System 10 may comprise a localized system, wherein components of the system are within a single physical location. Alternatively, system 10 may comprise distributed elements, with system elements dispersed from each other physically, but communicating with each other via one or more communication links. Further alternatively, system 10 may comprise one or more localized systems coupled to each other and to one or more distributed systems. Herein, by way of example, system 10 is assumed to comprise a localized system.

Storage system 10 is operated by an operator 16, who typically uses a workstation 18, connected to the system, to operate system 10 with system operation software 22. Software 22 comprises functions which enable a computing system to implement the embodiments described herein, and the software may be stored in workstation 18, and/or in system 10. Software 22 may be supplied in electronic form or on tangible media such as a magnetic storage disk or a compact disk which are readable by a computer, or by other means known in the art for permanent storage of electronic data.

Storage system 10 comprises one or more generally similar interfaces 20, which act as communication ports between hosts 12 and storage elements 31 of the storage system. The interfaces are coupled to the storage elements, described in more detail below, by a switch 30, although any other convenient form of coupling may be used. Interfaces 20 transfer data to be stored, and requests for data, from hosts 12 to the storage system. Interfaces 20 also transfer data from the system to hosts 12. Each interface 20 comprises an interface processing unit (PU) 24, and a memory 26. Memory 26 includes one or more buffers 28, which are used by the processing unit of the interface to store data, and requests for the data, prior to transmittal of the data and/or the requests to hosts 12 or to other elements of system 10.

Storage elements 31 comprise generally similar caches 32. The storage elements also comprise generally similar sets 40 of non-volatile storage devices, the devices typically being disks that use magnetic media to store data. However, sets 40 may comprise any other convenient non-volatile storage device, such as, but not limited to, magnetic tape and/or optical disks. By way of example, each set 40 is coupled to one cache 32. U.S. patent application Ser. No. 10/620,249, which is assigned to the assignees of the present invention and which is incorporated herein by reference, describes other possible methods for coupling caches 32 to sets 40. In the present application, sets 40 are distinguished from each other using a suffix letter, so that storage system 10 comprises sets 40A, 40B, 40C. Devices within a given set are distinguished from each other with a suffix number. By way of example, storage system 10 is assumed to comprise five sets 40A, 40B, 40C, 40D, and 40E, each set comprising four devices. Thus set 40A comprises devices 40A1, 40A2, 40A3, and 40A4, and set 40B comprises devices 40B1, 40B2, 40B3 and 40B4. The non-volatile storage devices are herein also referred to generically as devices 40n.

Each cache 32 comprises its own cache controller 34 and memory 36. Memory 36 typically has fast-access time to read and write data compared to the slow-access time for the same functions for devices 40n. Each memory 36 is typically configured to store data being transmitted to and from sets 40, and requests to read data from the sets, in the form of one or more queues.

A given host 12 typically uses storage system 10 according to a contract having technical arrangements concerning physical resource allocation that the host has with operator 16 of the system. In turn, the operator allocates the physical resources of system 10, comprising interfaces 20, caches 32, devices 40n and their components and connecting elements, to hosts 12 according to the respective contracts. In some embodiments of the present invention, the contracts provide for a conditionally transferable resource, wherein operator 16 is allowed to temporarily transfer use of a portion of the physical resources of system 10 originally allocated to a first user, under specific conditions, to another user of the storage system. For example, if the resource is the storage space on devices 40n, host H1 may agree that the operator may temporarily transfer space the host has been allocated to another host, under the condition that at the time of transfer host H1 is not using the space. At a later time, if host H1 requires the space, the host may give the operator advance warning that the host requires the transferred space, or equivalent. In addition to providing for the presence of conditionally transferable resources, embodiments of the present invention provide for implementation of the transfer of such resources.

By way of example, data stored in sets 40 is assumed to be grouped as specific partitions P1, P2, P3, Typically, the grouping is performed by operator 16 defining partitions P1, P2, P3, and associating the partitions with respective hosts. Under overall control of the operator, system 10 assigns a specific number of addresses, wherein the data may be stored, to each partition. As described in more detail below, at least a portion of the storage capacity associated with the partitions is conditionally transferable. Advantageously, the data of each given partition is spread evenly over a number of devices 40n. Methods for evenly spreading the data of a partition over devices 40n are described in U.S. patent application Ser. No. 10/620,080, which is assigned to the assignees of the present invention and which is incorporated herein by reference. By way of example, devices 40n in system 10 are assumed to be generally configured as explained in U.S. patent application Ser. No. 10/620,080, so that groups of physical addresses of each device 40n are distributed amongst partitions of system 10.

A management module 44 provides overall operational control of the data input/output (I/O) of system 10. Module 44 incorporates a processing unit 46 and a memory 48, typically a non-volatile memory. In conjunction with commands from workstation 18, module 44 also performs management operations for system 10. Functions typically performed by the module are described in more detail in U.S. patent application Ser. No. 10/886,359, which is assigned to the assignees of the present invention and which is incorporated herein by reference.

On startup of system 10, operator 16 uses operation software 22 to generate three storage space look-up tables 50, 52, and 54, which module 44, interfaces 20, and/or caches 32 may refer to in performing their functions of transferring data and requests for data. The tables are shown in more detail in FIG. 1B. Addresses in the tables are in hexadecimal format.

Look-up table 50 gives a correspondence between different partitions required for system 10 and logical address (LA) ranges, as well as a correspondence between unallocated (U/A) space in the system and logical addresses. The sizes of the partitions are typically set by operator 16 according to requirements of hosts 12. In the example shown in FIG. 1B, operator 16 allocates three partitions P1, P2, and P3 to have equal ranges of logical addresses, each range equaling H1000 addresses. By way of example unallocated space is also assumed to equal H1000 addresses. Table 50 also has a set/unset indication 51. If the indication is set, for example to 1, then module 44, interfaces 20, and/or caches 32 are able to use the table. If the indication is unset, having for example the value 0, the module, caches, and interfaces may not use the table.

In the present disclosure, tables having the same correspondences, but with different values within the tables, are distinguished by using one or more primes ' after the table identifying numeral, and the tables with the primes are also referred to as alternative tables. Thus, partition-logical address tables having different values from those of table 50 are referred to as alternative table 50', alternative table 50".

Look-up table 52 is typically generated by module 44, and gives a correspondence between logical addresses of table 50 and physical addresses on devices 40n. In the example shown in FIG. 1B, each range of logical addresses for unallocated space or a partition is subdivided into sub-ranges of logical addresses, and module 44 allocates respective corresponding ranges of physical addresses to the logical address sub-ranges. In addition, table 52 comprises a use-of-space indication 53, typically a one-bit value, for each of the sub-ranges. The use-of-space indication is set, as exemplified herein to 1, if the sub-range contains stored data, and is unset, as exemplified herein by having a value 0, if the sub-range does not contain stored data. Thus, indication 53 is unset for unallocated space. The application of the use-of-space indication is described in more detail below.

For each partition defined in table 50, look-up table 54 gives a fraction of the partition addresses that may be conditionally transferable to another partition. Such addresses are typically available for conditional transfer by the operator/module 44 if one of the hosts is not making full use of the resources, in this case the addresses, that have been allocated to it as part of the partition definition. The conditionally transferable addresses are typically a consequence of a contract that a host 12 has for usage of system 10. Thus, by way of example, P2 is assumed to be contracted to a given host 12, and to have up to 70% of its addresses conditionally transferable. That is, providing the space is not already being used, module 44 may use up to 70% of the addresses of P2 to fulfill a need for storage space for one of the other hosts, as described in more detail below with reference to flowchart 150 (FIG. 3). Other contracts for conditionally transferable addresses/resources, such as having a fixed minimum amount of space with an option to receive more space if available, will be apparent to those having ordinary skill in the art. All such forms of conditionally transferable addresses/resources are assumed to be comprised within the scope of the present invention.

Table 50 gives a correspondence between partitions and ranges of logical addresses used by the logical units. Table 52 gives a correspondence between logical addresses, physical addresses, and a use-of-space indication. Table 54 gives a correspondence between partitions and conditionally transferable space. Other methods for giving correspondences are well known in the art, for example, by storing corresponding elements at related logical addresses. All such methods are assumed to be comprised within the scope of the present invention, and may be used instead of the tables described herein.

By way of example, tables 50, 52, and 54 are assumed to be stored in memory 48. However, it will be understood that the tables, and/or copies of the tables, and/or sub-sections of the tables, may be stored in other elements of system 10. For example, each interface memory 26 may store a copy of tables 50 and 52, so that rather than communicating with module 44, a given interface may consult its own local tables to decide the disposition of data and/or requests for data that the interface needs to transfer. Alternatively or additionally, for each cache, cache memory 36 may store the subsection of tables 52 having the correspondence between the physical addresses and the use-of-space that apply to storage devices 40n coupled to the cache.

On startup of system 10, operator 16 also uses operation software 22 to generate a bandwidth look-up table 64, a conditionally transferable cache memory table 68 and a redundancy look-up table 66. Table 64 gives allocations of partitions of cache memory 36 to hosts 12, and the allocations may be used to apportion bandwidth for data being stored between the hosts. Table 68 gives percentages of the cache partitions that may be conditionally transferred. Cache controllers 34/module 44 may refer to table 64 and/or table 68 in checking the ability of respective caches to accept data. Table 64 and table 68 are described in more detail below with reference to FIGS. 4 and 5. Table 66 is used to set a level and/or type of redundancy for different partitions of system 10. Module 44 may refer to table 66 to check redundancy parameters for specific partitions. Table 66 is described in more detail below with reference to FIG. 6.

In addition to the look-up tables described above, at startup of system 10 software 22 allocates space for an alternative look-up tables, to be used for different values within the tables. The alternative lookup tables are typically stored in the same memories as the initial tables, although the alternative tables may be stored in different memories.

FIG. 2 is a flowchart 100 showing steps that module 44 performs to store data in system 10 using tables 50 and 52, according to an embodiment of the present invention. Those with ordinary skill in the art will be able to adapt the description given here, mutatis mutandis, for other actions performed by system 10, such as reading already stored data.

Prior to the steps of flowchart 100, module 44 is assumed to have generated table 50, and to have set indication 51 so that the module is able to use the table. Module 44 is also assumed to have generated table 52.

In a first step 102, one of interfaces 20 receives a request to store data in a given partition, herein assumed to be P1, from one of hosts 12. The interface also receives the data to be stored, The interface saves the data in its buffer 28.

In a second step 106, the interface refers to tables 50 and 52 to determine physical addresses at which data for P1 may be stored. The interface uses table 50 to determine the possible LA ranges available for storage in P1. The interface refers to table 52 for the LAs used in P1, and from the use-of-space indication, i.e., for those sub-ranges having the indication unset, determines which sub-ranges of physical addresses are available for storage.

In a check step 108, the interface confirms that sufficient space for storage of the data received is available at the physical addresses. If there is not sufficient space, in a step 110 the interface returns an error message to the host requesting the data storage.

In a step 112, if the interface receives confirmation that there is sufficient space, the interface forwards the data to be stored to the devices corresponding to the physical addresses, via the caches of the devices. The data is stored at those addresses, and the use-of-space indication for those physical addresses are set. Flowchart 100 then ends.

FIG. 3 shows flowchart 150, which comprises steps performed by module 44 on receipt of a request from operator 16 to change the range of logical addresses assigned to a partition of system 10, according to an embodiment of the present invention.

During implementation of the steps of flowchart 150, except for the final step of the flowchart, module 44 continues to operate system 10 substantially as described above with reference to FIG. 2, so that, for example, there is no change of I/O access to system 10 by hosts 12. Thus, the operations performed by the module in effecting flowchart 150 are invisible to the hosts 12, and have substantially no effect on the operation of the system.

In a first step 152, module 44 receives a request to change the size of a partition, the size of the partition already having been allocated in the system startup procedure referred to above. The request is typically generated by module 44, under overall programming control by operator 16. Such a request may be sent if a host has a contract with a provider of storage system 10 that the host is definitely allocated a minimum amount of storage space in system 10, but may be allocated more than the minimum if space is available.

By way of example, the request is assumed to be a request to increase the size of P1 from the H1000 logical addresses available to the partition, as given in table 50, to H1A00 logical addresses.

In a second step 154, module 44 checks if sufficient free space is available on devices 40n. The module may also transmit a message to the operator that the check is being performed. The free space in system 10 may be classified as unallocated space, described above with reference to table 50, or as conditionally transferable space, described above with reference to table 54. Typically, at least some of the logical and physical addresses in table 52 having use-of-space indications unset comprise conditionally transferable addresses.

At the startup of system 10, operator 16 sets operating parameters for handling change requests to the system, such as that of flowchart 150. In some embodiments of the present invention, module 44 performs the steps of flowchart 150 after receiving initial permission from operator 16. In the case of an increase in size request, the parameters typically comprise instructions to module 44 as to which type of free space, unallocated, conditionally transferable, and/or fractions thereof, the module is to evaluate to fulfill the request. The following description gives as a first example the case when module 44 may evaluate unallocated space, and as a second example the case when the module may evaluate conditionally transferable space. Methods to perform other evaluations, such as a combination of unallocated and conditionally transferable space, will be apparent to those having ordinary skill in the art.

The check of step 154 may be performed by the module looking for addresses having use-of-space indication 53 (table 52) unset. As the module finds free space, it changes the corresponding indications 53 to be set.

For the first example, module 44 determines that unallocated logical addresses H3000-H39FF are available.

For the second example, module 44 is assumed to determine that in P2 logical addresses H1000-H19FF do not have stored data, since their use-of-space indication is unset. Thus, from table 54, module 44 may transfer logical addresses H1000-H19FF from P2.

In a condition 156, module 44, as a result of the checks it performed in step 154, confirms that space is available, in which case a confirmatory message may be sent to the operator. If module 44 determines that space is not available, a space unavailable message is returned to operator 16, and flowchart 150 terminates.

In a step 160, assuming that in condition 156 module 44 finds that space is available, the module builds alternative look-up tables to table 50. FIG. 1B shows alternative look-up table 50' which corresponds to the first example, and alternative look-up table 50", which correspond to the second example.

In a final step 162, module 44 sets indication 51 on table 50' or 50", and unsets the indication on table 50, so that the module, caches, and interfaces use table 50' or 50". Module 44 reverts use-of-space indications 53, that were changed to be set in step 154, to their initial unset state. The module may delete table 50, and may inform the operator that the request has been successfully implemented. The flowchart then terminates.

Typically, module 44 performs the steps of flowchart 150 atomically, so that if the flowchart cannot terminate, the module does not implement any of the changes generated by intermediate steps of the flowchart, and continues to use table 50.

It will be appreciated, from consideration of the steps of flowchart 150, that changes of space allocation within storage system 10 do not affect the on-going operation of the storage system with respect to hosts 12, such as rates of completed I/O operations for each of the hosts. Furthermore, while flowchart 150 exemplifies transfer of a physical resource, in this case storage addresses, from a first partition to a second partition, it will be understood that module 44/operator 16 may use substantially the same steps to provide a reverse transfer, or a transfer to a third partition, at some future time of operation of system 10.

FIG. 4 is a schematic diagram of bandwidth table 64 an alternative bandwidth table 64', and conditional transferable cache memory table 68, according to an embodiment of the present invention. At startup of system 10, operator 16 assigns percentages of cache memories 36 that are to be used by different hosts 12 for queuing data to be stored in devices 40n. The assigned percentages, i.e., the partitions of the cache memory, determine a maximum rate at which each host may transfer data, and are typically assigned by the operator according to a contract that the host has with storage system 10. Alternatively, operator 16 may assign the percentages of cache memories 36 so that an overall rate of all I/O operations of system 10 is a maximum rate. By way of example tables 64 and 64' list three hosts H1, H2, and H3 which are respectively assigned cache memory partitions CM1, CM2, and CM3. In table 64 host H1 is assigned to use at least 40% of cache memories 36, host H2 is assigned to use at least 30% of the cache memories, and host H3 is assigned to use at least 30% of the memories.

In addition, at startup of system 10, operator 16 assigns percentages of CM1, CM2, CM3 that are conditionally transferable, the percentages typically being generated as a result of contracts that hosts H1, H2, and H3 have with the operator. The assignments are shown in table 68. By way of example, in table 68 each of the partitions of the cache memory assigned to hosts H1, H2, and H3 is assumed to have 10% conditionally transferable memory.

As described in more detail below with respect to FIG. 5, at some time after startup, operator 16/module 44 changes the allocations of the cache memory partitions to those shown in table 64', wherein the cache memory for host H1 has been increased to 50%, and the cache memory for host H2 has been decreased to 20%. The changes may be performed by operator 16, or by module 44, after inspection of table 68.

FIG. 5 is a flowchart 200 showing utilization of bandwidth table 64 when data is stored in storage system 10, according to an embodiment of the present invention. The steps of flowchart 200 are generally similar to those of flowchart 100 (FIG. 2) such that steps having the same identifying numerals in the two flowcharts comprise generally identical actions. In flowchart 200, details of actions of step 112 of flowchart 100 are given.

In flowchart 200, after the interface has confirmed in step 108 that there is sufficient space for storage of the data received, in a step 202 the interface forwards a query to the relevant cache controller 34 to check if its cache memory 36 has space available to receive the data. In the present example, it is assumed that host Hi is requesting use of cache memory 36.

In a first table check step 204, cache controller 34 checks table 64. If the values of table 64 are not exceeded, flowchart 200 continues to a step 206, wherein the interface is given permission to send its waiting data to the cache.

If in step 204 there is not sufficient space, the cache controller refers to module 44. Module 44, in a step 203, checks table 68 for percentages of partitions of cache memory that may be conditionally transferred, and constructs table 64' accordingly.

In a second table check step 205, cache controller 34 checks table 64'. If the values of table 64' are not exceeded, flowchart 200 continues to a step 206. If the values are exceeded, the cache controller instructs the interface to wait before sending its data.

In a step 208, the data from the interface is stored in cache memory 36, typically in a queue of the memory.

In a step 210, the data from the cache is read from cache memory 36, and in a final step 212, the data is stored at the physical addresses identified in step 106.

As illustrated by steps 202-212, operation of caches 32 are dynamic, with data constantly being added to and read from cache memories 36. Thus, for any change in allocated bandwidth within system 10, such as the exemplary change given in FIG. 4 from table 64 to table 64', the wait state generated by step 205 allows the storage system to automatically implement the changes.

Flowchart 200 has been described in relation to data transfer to the cache, using memories 36 of the caches to store/queue the incoming data. Those having ordinary skill in the art will be able to adapt the description of the steps in flowchart 200, mutatis mutandis, for conveyance and queuing of data transferred between caches 32 and devices 40n. Such data transfer is typically as a result of I/O activity between hosts 12 and system 10.

Those with ordinary skill in the art will be able to adapt the description for flowchart 200, mutatis mutandis, for other actions of system 10 where bandwidth required for the action is a consideration, such as data requests to devices 40n and reading of data from the devices.

FIG. 6 is a schematic diagram of redundancy scheme table 66, according to an embodiment of the present invention. FIG. 7 is a data allocation table 250 showing how data is stored in compliance with table 66, according to an embodiment of the present invention. Table 66 comprises a set/unset indication 67. Table 250 is derived from table 52, having the same logical address-physical address correspondences, and in addition comprises data/parity block allocations and a set/unset indication 251.

Data in system 10 may be stored redundantly, typically according to one of the redundant array of independent disks (RAID) schemes known in the art. Details of some RAID schemes are published by the University of California, Berkeley. Proprietary RAID schemes are also known in the art. In addition, combinations and variations on the published RAID schemes are also known in the art. Furthermore, methods other than the published RAID schemes and their combinations and variations are known in the art. Such combinations, variations and other methods are assumed to be comprised within the scope of the present invention. Herein, by way of example, data in system 10 is assumed to be stored according to one of the RAID schemes or variations thereof.

Depending on the RAID scheme used, e.g., for RAID 1, RAID 2, RAID 3, RAID 4, RAID 5, and RAID 6, stored data on devices 40n may be completely recovered on failure of one or more of the devices. For example, RAID 1 and RAID 5 provide complete protection if one device 40n fails, RAID 6 provides complete protection if two devices 40n fail.

In RAID 5 data blocks on separate devices 40n are grouped, and a parity block is calculated for each group of data blocks. Herein the parity block is assumed to be calculated by XORing the data blocks. The parity block is stored on a device 40n that is different from the devices where the data is stored. On failure of any one of the devices holding the data blocks, or the device holding the parity block, the lost data (or parity) may be completely recovered by XORing the remaining blocks.

In RAID 6 data blocks on separate devices 40n are grouped, and two different parity blocks are calculated for each group of data blocks. Herein the two parity blocks are assumed to be different Reed-Solomon syndromes. The two parity blocks are stored on separate devices 40n that are different from the data devices. On failure of any two of the devices storing the data or parity, the lost data (or parities) may be completely recovered.

Embodiments of the present invention enable two or more different redundancy schemes to be implemented simultaneously within storage system 10, so that data blocks on each given device 40n are stored according to respective redundancy schemes. This gives embodiments of the present invention significantly greater flexibility in resource allocation compared to prior art storage systems. By way of example, the description below assumes that data in storage system 10 is stored at system startup according to table 66, so that data blocks for P1, P2, and P3 (FIG. 1B) are respectively stored according to RAID 5, RAID 6, and RAID 5. The RAID 5 storage is assumed to be of the form of (3 data blocks+1 parity block), and the RAID 6 storage is assumed to be of the form of (3 data blocks+2 different parity blocks). Those having ordinary skill in the art will be able to adapt the following description, mutatis mutandis, for storage systems having other redundancy schemes, and/or more than two different such schemes.

At startup, and before any redundancy change request is received, module 44 refers to table 66 to decide how initial data and/or data changes for each partition of system 10 are to be stored. Herein a stored data block Dn in Pm is referred to as data block PmDn, where m, n are hexadecimal integers. A parity block for the group of data blocks PmDn'-PmDn" is referred to as parity block PmYn'n", or as PmY(1)n'n", PmY(2)n'n", . . . if there is more than one parity block, where n', n" are the initial and final hexadecimal integers of the group of data blocks for which the parity block(s) are calculated. Table 250 (FIG. 7) shows how module 44 stores data for P1 to form RAID 5 redundancy. As shown in the table, three data blocks of a group are stored on separate devices. Module 44 calculates a parity block for each group of three data blocks and stores the parity block in a device different from the devices storing the data blocks. For example, data blocks P1D4, P1D5, P1D6, are stored on devices 40E1, 40A2, and 40B2 respectively, and parity block P1Y46 is stored on device 40C2. Thus, devices 40E1, 40A2, 40B2, and 40C2 form an assemblage of storage devices storing data/parity blocks P1D4, P1D5, P1D6, P1Y46 according to a RAID 5 scheme.

Table 250 also shows how module 44 stores data for P2 to form RAID 6 redundancy. Three data blocks and two different parity blocks are stored on separate devices. For example, data blocks P2D1, P2D2, P2D3, are stored on devices 40A1, 40B1, and 40C1 respectively, and parity blocks P2Y(1)13 and P2Y(2)13 are stored on devices 40D1 and 40E1 respectively. Thus, devices 40A1, 40B1, 40C1, 40D1, and 40E1 form an assemblage of storage devices storing data/parity blocks P2D1, P2D2, P2D3, P2Y(1)13 and P2Y(2)13 according to a RAID 6 scheme.

Inspection of tables 66 and table 250 illustrates that embodiments of the present invention enable data within system 10 to be stored with different redundancy schemes mixed within a single set of disks. Furthermore, as is illustrated by table 250, any given single storage device of the system may have data/parity blocks stored on the device which are protected by different respective redundancy schemes. For example, device 40A1 stores a data block P1D1 which is protected by a RAID 5 scheme, and a data block P2D1 which is protected by a RAID 6 scheme; device 40E1 stores a data block P1D4 protected by RAID 5, and a parity block Y(2)13, protected by RAID 6.

As is described in more detail below, with reference to FIGS. 8, 9A and 9B, embodiments of the present invention enable changes in redundancy schemes to be applied to data stored in system 10, by using an alternative redundancy scheme table 66' and an alternative data allocation table 250'. In any data change in the partitions of system 10, module 44 checks which of tables 66 and 66' has indication 67 set, and uses this table when implementing the changes. Also, in the event that one or more devices 40n fail, requiring that data be recovered, module 44 may use the table with indication 67 set to determine the redundancy scheme to be applied for the recovery. The recovery scheme found from the table is applied to the remaining data and/or parity blocks.

FIG. 8 is a flowchart 300 of steps taken by module 44 to implement redundancy schemes and changes of redundancy schemes in system 10, according to an embodiment of the present invention. FIGS. 9A and 9B show an alternative data allocation table 250' complying with an alternative redundancy scheme table 66', according to an embodiment of the present invention. In a first step 302 of flowchart 300, operator 16 provides module 44 with redundancy schemes for the partitions of system 10, and the module generates table 66 (FIG. 6). The module stores data blocks in devices 40n according to the schemes given in table 66. The module calculates and stores parity blocks for the stored data blocks, also according to the schemes given in table 66. Module 44 also generates data allocation table 250 (FIG. 7), showing logical and physical addresses of the stored data and parity blocks for the partitions of table 66. At completion of the generation of tables 66 and 250, module 44 sets indication 67 and indication 251.

In a second step 304, module 44 receives a request from operator 16 for a redundancy scheme change in one of the partitions of system 10. By way of example, the request change is assumed to be a request to change the redundancy scheme of P1 from RAID 5 to RAID 6. Module 44 constructs table 66' in response to the request.

In a third step 306, module 44 initiates changes required in order to implement table 66'. Herein the changes required are assumed, by way of example, not to require transfer, copying, and/or changes of data blocks, such as would be required for changing between a RAID 5 and a RAID 0 redundancy scheme. Rather, the changes described herein are assumed to only require changes in values and/or numbers of parity blocks. Those having ordinary skill in the art will be able to adapt the description herein, mutatis mutandis, for implementing transfer, copying, and/or changes of data blocks.

Typically, module 44 implements the changes necessary to comply with table 66' by constructing new parity blocks at new physical addresses, so that during the changes the parity blocks and physical addresses required for table 66 are still available. Herein, the new parity blocks are assumed to be stored at addresses that were initially unallocated. Alternatively or additionally, at least some of the physical addresses for the new parity blocks may be derived from conditionally transferable addresses, such as module 44 may find using table 54 (FIG. 1B).

Table 250' (FIG. 9B) shows the new parity blocks, and their new physical addresses, that module 44 generates. For clarity, in table 250', only data and parity blocks and their addresses for P1 are shown, since implementing the changes required by table 66' does not require any changes for P2 or P3. Since the new redundancy scheme for P1 is RAID 6, module 44 generates two new parity blocks for each set of three data blocks, all the blocks being on separate devices 40n. For example, as shown in table 250', P1D1 is on device 40A1, P1D2 is on device 40B1, P1D3 is on device 40C1, P1Y(1)13 is on device 40D1, and P1Y(2)13 is on device 40E1.

In a final step 308, when module 44 has completed the changes required in step 306, the module sets the indications for table 66' and table 250', and unsets the indications for table 66 and table 250. Thus, for future data operations concerning redundancy, such as storing new data and/or recovering from a device failure, module 44 refers to table 66'. Module 44 may delete the parity blocks corresponding table 66 which have been superceded by the parity blocks corresponding to table 66'. Module 44 may also delete table 66 and/or table 250, since the tables have been superceded. Alternatively, depending on system 10 constraints such as availability of space, module 44 may retain the parity blocks that have been superceded, table 66, and/or table 250. If the parity blocks and/or the tables are retained, the previous redundancy scheme may be reverted to substantially instantaneously.

In embodiments of the present invention, changes of allocations of the physical resources may be allocations to external users of the storage system, such as hosts 12, or internal users of the storage system. For example, interfaces 20 are internal users of switch 30 (FIG. 1A). Module 44 may generate a first interface bandwidth table similar to table 64, having a correspondence between interfaces and memory of switch 30 allocated for data transfer between the interfaces and the switch. The module may then change values in the first interface bandwidth table, to form an alternative first interface bandwidth table, and use the alternative table, generally as described above for tables 64 and 64'.

As a second example, module 44 may generate a second interface bandwidth table similar to table 64, having a correspondence between hosts 12 and partitions of buffers 28 of interfaces 20 allocated for I/O requests between the interfaces and the hosts. The module may then change the allocation, typically after being informed of a change need by one of the interface PUs 24.

For each example described above, module 44 typically generates a respective table, similar to table 68, showing the percentage of the partition that is conditionally transferable, and refers to the table before generating a new allocation table.

It will be appreciated that the embodiments described above give examples of changes of allocation of a physical resource that may be implemented on a storage system, and that each of the changes so implemented does not affect operation of the other resources of the system. For example, changes in size of a partition, as exemplified by flowchart 150, may be implemented without affecting the maximum rate bandwidths defined according to table 64. Similarly changes in bandwidth, implemented by changing table 64 to table 64', do not affect the available size of a partition, or a redundancy scheme assigned to the partition, such as that defined in table 66.

It will also be appreciated that the physical resources having allocation changes described above are cited by way of example, and that the scope of the present invention includes allocation changes for other physical resources. Such other physical resources include, but are not limited to, types of storage volatile/non-volatile storage space, and storage device seek time, used by storage system 10.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for operating a storage system, comprising:
performing an initial allocation of respective partitions of a physical storage resource of the storage system to respective hosts of the storage system, wherein:
a first partition is initially allocated to a first host at a first time, the first partition comprising a first plurality of ranges of memory addresses, and
a second partition is initially allocated to a second host at the first time, the second partition comprising a second plurality of ranges of memory addresses;
assigning two or more ranges of memory addresses in the first plurality of ranges of memory addresses in the first partition that are available for conditional transfer of use by the second partition when not in use by the first partition;
assigning two or more ranges of memory addresses in the second plurality of ranges of memory addresses in the second partition that are available for conditional transfer of use by the first partition when not in use by the second partition, wherein assigning the two or more ranges of memory addresses in the first plurality of memory addresses and assigning the two or more ranges of memory addresses in the second plurality of memory ranges occur at the first time;
receiving data from the second host for storage in the physical storage resource;
determining if the physical storage resource includes sufficient free memory space to store the data;
returning an error message to the second host if the physical storage resource includes insufficient free memory space to store the data;
determining if the second partition includes sufficient free memory space to store the data;
storing the data in the second partition if the second partition includes sufficient free memory space to store the data;
determining if one or more of the two or more ranges of memory addresses in the first plurality of ranges of memory addresses are being used by another host if the second partition includes insufficient free memory space to store the data;
locating another partition for storing the data if the of two or more ranges of memory addresses in the first plurality of ranges of memory addresses are being used by another host;

temporarily transferring use of the one or more of the two or more ranges of memory addresses in the first plurality of ranges of memory addresses from the first host to the second host at a second time subsequent to the first time and in accordance with a predetermined condition if the one or more of the two or more ranges of memory addresses in the first plurality of ranges of memory addresses is not being used by another host, the predetermined condition providing the first host with the ability to require the return of the use of the transferred one or more of the two or more ranges of memory addresses in the first plurality of ranges of memory addresses during such temporary use of the one or more of the two or more ranges of memory addresses in the first plurality of ranges of memory addresses by the second host; and returning, by the second host, use of the transferred one or more of the two or more ranges of memory addresses in the first plurality of ranges of memory addresses to the first host when the first host requires return of the use of the transferred one or more of the two or more ranges of memory addresses in the first plurality of ranges of memory addresses.

2. The method according to claim 1, wherein the physical storage resource comprises a slow-access physical storage medium, and wherein the allocation of the respective partitions comprises respective numbers of physical addresses of the slow-access physical storage medium allocated to the respective hosts for storage of data.

3. The method according to claim 1, wherein the physical storage resource comprises a fast-access physical storage medium, and wherein the allocation of the respective partitions comprises respective numbers of physical addresses of the fast-access physical storage medium allocated to the respective hosts for transfer of data according to respective preset data transfer bandwidths.

4. The method according to claim 1, wherein the allocation of the respective partitions of the physical storage resource comprises an allocation of two or more different redundancy schemes to the respective hosts.

5. The method according to claim 4, wherein the physical storage resource comprises a non-volatile physical storage medium, wherein performing the allocation comprises storing data at physical addresses of the non-volatile physical storage medium according to the allocation, and wherein changing the allocation comprises storing further data at alternate physical addresses of the non-volatile physical storage medium.

6. The method according to claim 1, further comprising agreeing, by the first host, to transfer the one or more of the two or more ranges of memory addresses in the first plurality of ranges of memory addresses prior to the temporary transfer.

7. The method according to claim 1, further comprising verifying that the one or more of the two or more ranges of memory addresses in the first plurality of ranges of memory addresses is not being used by the first host prior to the temporary transfer of the one or more of the two or more ranges of memory addresses in the first plurality of ranges of memory addresses.

8. An apparatus for operating a storage system including a first host and a second host, comprising:
a physical storage resource partitioned to form a first partition and a second partition, wherein:
the first partition comprises a first plurality of ranges of memory addresses, and
the second partition comprises a second plurality of ranges of memory addresses; and a processing unit coupled to the physical storage resource and configured to:
allocate the first partition to the first host at a first time,
allocate the second partition to the second host at the first time,
assign two or more ranges of memory addresses in the first plurality of ranges a memory addresses that are available for conditional transfer for use by the second partition when not in use by the first partition,
assign two or more ranges of memory addresses in the second plurality of ranges of memory addresses that are available for conditional transfer for use by the first partition when not in use by the second partition, wherein the two or more ranges of memory addresses in the first plurality of memory addresses and the two or more ranges of memory addresses in the second plurality of memory addresses are assigned at the first time,
receive data from the second host for storage in the physical storage resource,
determine if the physical storage resource includes sufficient free memory space to store the data,
return an error message to the second host if the physical storage resource includes insufficient free memory space to store the data,
determine if the second partition includes sufficient free memory space to store the data,
store the data in the second partition if the second partition includes sufficient free memory space to store the data,
determine if one or more of the two or more memory addresses in the first plurality of ranges of memory addresses is being used by another host if the second partition includes insufficient free memory space to store the data,
locate another partition for storing the data if the two or more memory addresses in the first plurality of ranges of memory addresses are being used by another host,
temporarily transfer use of the one or more of the two or more memory addresses in the first plurality of ranges of memory addresses from the first host to the second host in accordance with a predetermined condition at a second time subsequent to the first time if the one or more of the two or more memory addresses in the first plurality of ranges of memory addresses is not being used by another host, the predetermined condition providing the first host with the ability to require return of the use of the transferred one or more of the two or more memory addresses in the first plurality of ranges of memory addresses during such temporary use of the transferred one or more of the two or more memory addresses in the first plurality of ranges of memory addresses by the second host, and
return use of the transferred one or more of the two or more memory addresses in the first plurality of ranges of memory addresses to the first host when the first host requires return of the use of the transferred one or more of sub partitions of the two or more memory addresses in the first plurality of ranges of memory addresses.

9. The apparatus according to claim 8, wherein the physical storage resource comprises a slow-access physical storage medium, and wherein the allocation of the first and second partitions comprises respective numbers of physical addresses of the slow-access physical storage medium allocated to the first and second hosts for storage of data.

10. The apparatus according to claim 8, wherein the physical storage resource comprises a fast-access physical storage medium, and wherein the allocation of the first and second partitions comprises respective numbers of physical addresses of the fast-access physical storage medium allocated to the first and second hosts for transfer of data according to respective preset data transfer bandwidths.

11. The apparatus according to claim 8, wherein the allocation of the first and second partitions of the physical storage resource comprises an allocation of two or more different redundancy schemes to the first and second hosts.

12. The apparatus according to claim 8, wherein the processing unit is configured to verify that the first host has agreed to transfer the one or more of the two or more memory addresses in the first plurality of ranges of memory addresses prior to the temporary transfer.

13. The apparatus according to claim 8, wherein the processing unit is configured to verify that the one or more of the two or more memory addresses in the first plurality of ranges of memory addresses is not being used by the first host prior to the temporary transfer.

14. The apparatus according to claim 8, further comprising:
monitoring use of the one or more of the two or more memory addresses in the first plurality of ranges of memory addresses by the first host according to directions of an operator of the storage system prior to the temporary transfer.

15. A method for operating a storage system including a physical storage resource and first and second hosts coupled to the physical storage resource, the method comprising:
partitioning the physical storage resource into a first partition comprising a first plurality of ranges of memory addresses and into a second partition comprising a second plurality of ranges of memory addresses;
allocating the first partition to the first host at a first time;
allocating the second partition to the second host at the first time;
assigning two or more ranges of memory addresses in the first plurality of ranges of memory addresses that are available for conditional transfer for use by the second partition when not in use by the first partition;
assigning two or more ranges of memory addresses in the second plurality of ranges of memory addresses that are available for conditional transfer for use by the first partition when not in use by the second partition, wherein assigning the two or more ranges of memory addresses in the first plurality of ranges of memory addresses and assigning the two or more ranges of memory addresses in the second plurality of ranges of memory addresses occur at the first time;
generating a first look-up table providing data representing the first plurality of ranges of memory addresses allocated to the first host and the second plurality of ranges of memory addresses allocated to the second host;
generating a second look-up table providing data representing the two or more ranges of memory addresses in the first plurality of ranges of memory addresses that are available for conditional transfer of use by the second partition and data representing the two or more ranges of memory addresses in the second plurality of ranges of memory addresses that are available for conditional transfer of use by the first partition;
receiving data from the second host for storage in the physical storage resource;
determining if the physical storage resource includes sufficient free memory space to store the data;
returning an error message to the second host if the physical storage resource includes insufficient free memory space to store the data;
determining if the second partition includes sufficient free memory space to store the data;
storing the data in the second partition if the second partition includes sufficient free memory space to store the data;
determining if the two or more ranges of memory addresses in the first plurality of ranges of memory addresses are being used by another host if the second partition includes insufficient free memory space to store the data;
locating another partition for storing the data if the two or more ranges of memory addresses in the first plurality of ranges of memory addresses are being used by another host;
temporarily transferring use of one or more of the two or more ranges of memory addresses in the first plurality of ranges of memory addresses from the first host to the second host at a second time subsequent to the first time in accordance with a predetermined condition if the one or more of the two or more ranges of memory addresses in the first plurality of ranges of memory addresses are not being used by another host, the predetermined condition enabling the first host to require that the second host return use of the transferred one or more of the two or more ranges of memory addresses in the first plurality of ranges of memory addresses during such temporary use of the one or more of the two or more ranges of memory addresses in the first plurality of ranges of memory addresses by the second host; and
generating a third look-up table providing data representing a current allocation of the two or more ranges of memory addresses in the first plurality of ranges of memory addresses and the two or more ranges of memory addresses in the second plurality of ranges of memory addresses between the first host and the second host.

16. The method of claim 15, further comprising:
temporarily transferring use of one or more of the two or more ranges of memory addresses in the second plurality of ranges of memory addresses from the second host to the first host in accordance with a second predetermined condition that enables the second host to require that the first host return use of the one or more of the two or more ranges of memory addresses in the second plurality of ranges of memory addresses; and
updating the third look-up table to represent a first new current allocation of the two or more ranges of memory addresses in the first plurality of ranges of memory addresses and the two or more ranges of memory addresses in the second plurality of ranges of memory addresses between the first host and the second host.

17. The method of claim 16, further comprising:
returning use of the one or more of the two or more ranges of memory addresses in the first plurality of ranges of addresses to the first host; and
updating the third look-up table to reflect a second new current allocation of the two or more ranges of memory addresses in the first plurality of ranges of memory addresses and the two or more ranges of memory addresses in the second plurality of ranges of memory addresses between the first host and the second host.

18. A storage system, comprising:
a first host;
a second host;

a physical storage resource coupled to the first host and the second host, the physical storage resource comprising:
  a first partition initially allocated to the first host at a first time and comprising a first quantity of storage space, the first partition comprising a first plurality of ranges of addresses,
  a second partition initially allocated to the second host at the first time and comprising a second quantity of storage space, the second partition comprising a second plurality of ranges of memory addresses,
  two or more ranges of memory addresses in the first plurality of ranges of memory addresses that are available for conditional transfer of use by the second partition when not in use by the first partition,
  two or more ranges of memory addresses in the second plurality of ranges of memory addresses that are available for conditional transfer of use by the first partition when not in use by the second partition, wherein the two or more ranges of memory addresses in the first plurality of ranges of memory addresses and the two or more ranges of memory addresses in the second plurality of ranges of memory addresses are assigned at the first time,
  a first look-up table providing data representing the first plurality of ranges of memory addresses initially allocated to the first host at the first time and the second plurality of ranges of memory addresses initially allocated to the second host at the first time,
  a second look-up table providing data representing the two or more ranges of memory addresses in the first plurality of ranges of memory addresses that are available for conditional transfer of use by the second partition and data representing the and the two or more ranges of memory addresses in the second plurality of ranges of memory addresses that are available for conditional transfer of use by the first partition
  a third look-up table providing data representing a current allocation of the two or more ranges of memory addresses in the first plurality of ranges of memory addresses and the two or more ranges of memory addresses in the second plurality of ranges of memory addresses between the first host and the second host; and
a processor coupled to the physical storage resource, the first host, and the second host, wherein the processor is configured to:
  receive a request from the second host to store an amount of data in the physical storage resource,
  determine if the physical storage resource includes sufficient free memory space to store the data,
  return an error message to the second host if the physical storage resource includes insufficient free memory space to store the data,
  determine if the second partition includes sufficient free memory space to store the data,
  store the data in the second partition if the second partition includes sufficient free memory space to store the data,
  determine if the two or more ranges of memory addresses in the first plurality of ranges of memory addresses are being used by another host if the second partition includes insufficient free memory space to store the data,
  locate another partition for storing the data if the two or more ranges of memory addresses in the first plurality of ranges of memory addresses are being used by another host,
  temporarily transfer use of one or more of the two or more ranges of memory addresses in the first plurality of ranges of memory addresses from the first host to the second host at a second time subsequent to the first time and in accordance with a predetermined condition if the one or more of the two or more ranges of memory addresses in the first plurality of ranges of memory addresses are not being used by another host, wherein the predetermined condition enables the first host to require the second host to return use of the transferred one or more of the two or more ranges of memory addresses in the first plurality of ranges of memory addresses to the first host if the first host needs to use the one or more of the two or more ranges of memory addresses in the second plurality of ranges of memory addresses to store data, and
  return use of the transferred one or more of the two or more ranges of memory addresses in the first plurality of ranges of memory addresses to the first host if the first host needs to use the transferred one or more of the two or more ranges of memory addresses in the first plurality of ranges of memory addresses to store the data.

* * * * *